United States Patent
Arai et al.

[11] Patent Number: 5,855,457
[45] Date of Patent: Jan. 5, 1999

[54] DISPOSABLE CUTTING TIP CLAMP FOR A MILLING MACHINE

[75] Inventors: Tatsuo Arai; Takayoshi Saito; Norio Aso, all of Yuuki-gun, Japan

[73] Assignee: Mitsubishi Materials Corporation, Tokyo, Japan

[21] Appl. No.: 790,941

[22] Filed: Jan. 29, 1997

[30] Foreign Application Priority Data

Jan. 31, 1996 [JP] Japan ................................. 8-016045

[51] Int. Cl.$^6$ ........................................... B23C 5/22
[52] U.S. Cl. .............................. 407/40; 407/46; 407/47; 407/53
[58] Field of Search ............................. 407/40, 46, 47, 407/48, 33, 34, 25, 53

[56] References Cited

U.S. PATENT DOCUMENTS 4,828,436  5/1989  Briese ................................. 407/46 X

FOREIGN PATENT DOCUMENTS 0 247 011    11/1987    European Pat. Off. .
0449253      10/1991    European Pat. Off. .................. 407/48
3810259 A1   10/1989    Germany .

*Primary Examiner*—Andrea L. Pitts
*Assistant Examiner*—Henry W. H. Tsai
*Attorney, Agent, or Firm*—Armstrong, Westerman, Hattori, McLeland & Naughton

[57] ABSTRACT

A disposable tip clamp mechanism capable of simplifying the mounting operation of a disposable cutting tip to produce an improved effect for preventing the dislocation of the tip is described. A screw member 36 having a screw hole 36a in the head 36c thereof is connected with the mounting screw hole 33 of a tip mounting seat 32, with the head portion 36c projecting from the tip mounting seat 32 and a disposable tip 37 is seated on the tip mounting seat 32 such that the engaging portion 37f thereof engages the head portion 36c of the screw hole-containing screw member 36.

2 Claims, 5 Drawing Sheets

DISPOSABLE CUTTING TIP CLAMP FOR A MILLING MACHINE

BACKGROUND OF THE INVENTION

The present invention relates to a clamp mechanism for detachably mounting a disposable cutting tip to the mounting seat of a tool main body, such as a disposable byte, boring bar, cutter, end mill, or the like, and, more specifically, to a clamp mechanism capable of simply mounting a disposable cutting tip and preventing the ejection of the tip from the tool main body, thereby enhancing the displacement-prevention effect thereof.

DESCRIPTION OF THE RELATED ART

As a conventional disposable cutting tip clamp mechanism, there has been proposed a mechanism as disclosed in, for example, Japanese Unexamined Utility Model Publication No. 64-23302. As shown in FIG. 5 herein, the disposable tip clamp mechanism is composed of a tool main body 11 having a bottomed positioning hole 13 formed in a tip mounting seating surface 12. A mounting screw hole 14 is formed in the bottom surface 13a of the positioning hole 13. A seat 15 is mounted on the tip-mounting seat 12 and has a locking hole 15a formed approximately at the center thereof and a diameter approximately as large as that of the positioning hole 13. A cylindrical locking member 16 is provided to be engaged with the locking hole 15a of the seat 15 and the positioning hole 13, and a tip-mounting screw 18 is inserted into the tip hole 17a of a disposable cutting tip 17 and the locking member 16 with the head portion thereof locked to the chip hole 17a of the tip 17, and the extreme end thereof threadedly connected with the mounting screw hole 14 in the positioning hole 13 to thereby fix the tip 17 to the tip-mounting seat 12 through the seat 15.

PROBLEMS WITH THE PRIOR ART

However, since the bottomed positioning hole 13 is formed in the tip mounting seat 12 and the locking member 16 is engaged therewith, the mounting screw hole 14, with which the extreme end portion of the tip mounting screw 18 is threaded, is formed in the bottom surface 13a of the positioning hole 13 which is located below the tip mounting seat 12. Then, the head portion of the tip mounting screw 18 is locked to the tip hole 17a of the disposable tip 17 seated on the surfaces of the locking member 16 and the seat 15. Therefore, since the axial space between the tip hole 17a of the disposable tip 17 and the mounting screw hole 14 is made excessively long, it is difficult to produce a high clamp strength such that, when an excessive centrifugal force is applied to the disposable tip 17, there is a possibility that the tip 17 will be displaced.

As a disposable tip clamp mechanism having a high displacement prevention effect, there is proposed a clamp mechanism as disclosed in Japanese Unexamined Utility Model Publication No. 64-23301. As shown in FIG. 6, the disposable tip clamp mechanism is composed of a tool main body 21 having a mounting screw hole 23 and a plurality of seat mounting screw holes 24 formed in a tip mounting seating surface 22, a seat 25 placed on the tip mounting seat 22 and having a through hole 25a, which is located at the position corresponding to the mounting screw hole 23 and has a diameter larger than that of the mounting screw hole 23. Locking holes 25b at the positions corresponding to the seat mounting screw holes 24 receive threaded pins 26 which are engaged with the seat mounting screw holes 24 of the tip mounting seat 22 together with the locking holes 25b of the seat 25. A tip mounting screw 28 is inserted into the tip hole 27a of the disposable tip 27 and the through hole 25a of the seat 25, with the head portion thereof locked to the tip hole 27a and the shaft end thereof threadedly connected with the mounting screw hole 23 of the tip mounting seat 22 to thereby fix the disposable cutting tip 27 to the tip mounting seating surface 22 through the seat 25.

In this disposable tip clamp mechanism, since the axial space between the tip hole 27a of the disposable tip 27 and the mounting screw hole 23 of the tip mounting seating surface 22 in FIG. 6 is shorter than that of the tip clamp mechanism shown in FIG. 5, when a centrifugal force is increased, the displacement of the cutting tip 27 is reduced.

However, since the seat 25 is fixed by the plurality of pins 26 in the tip clamp mechanism, the number of parts is increased and must be made small in size. As a result, this mechanism has a disadvantage that it is troublesome to mount the disposable cutting tip 27 to the tool main body 21.

Taking the above circumstances into consideration, it is an object of the present invention to provide a clamp mechanism capable of mounting a disposable cutting tip simply and in a way that enhances the displacement prevention effect thereof.

SUMMARY OF THE INVENTION

A disposable cutting tip clamp mechanism according to a first embodiment of the present invention is arranged such that a cutting tip having a tip hole formed at the center thereof is seated on a tip mounting seat disposed in a tool main body. A tip mounting screw is inserted into the hole of the disposable tip and the tip is fixed by locking the head portion of the tip mounting screw to the tip hole. The invention is characterized in that the tip mounting seat has a bottom surface in which a mounting screw hole is formed and tip positioning wall surfaces extend steeply from the seat bottom surface for positioning the tip. A mounting hole is formed in the seat bottom surface of the tip-mounting seat. A screw member having a screw hole in the head portion thereof is threaded in the mounting screw hole with the head portion of the screw member projecting from the bottom surface of the tip mounting seat. The tip hole of the disposable tip has an engaging portion into and with which the head portion of the screw member containing a screw hole is inserted and engaged. Such screw member is disposed off-center with respect to the tip hole of the disposable tip toward the tip-positioning wall surface, and the tip mounting screw fixes the tip by being threadedly connected with the screw hole in the screw hole-containing screw member. Therefore, since the axial distance between the hole of the cutting tip to which the head portion of the tip mounting screw is fixed and the screw hole-containing screw member with which the tip mounting screw is threaded is short, the tip mounting screw is difficult to bend. Thus, when a force for separating the tip from the tip positioning wall surfaces of the cutting tool is applied by a centrifugal force, or the like, a high displacement prevention effect can be exhibited by the locking of the tip mounting screw. Further, even if the disposable tip is induced to separate from the tip positioning wall surfaces against the tip mounting screw, it is locked by the screw hole-containing screw member.

Further, the disposable cutting tip can be mounted by a reduced number of parts without using small parts.

A disposable cutting tip clamp mechanism of a second embodiment of the present invention is characterized in that a seat having a locking hole is interposed between the tip mounting seat and the disposable cutting tip. The screw hole-containing screw member is inserted into the locking hole of the seat and the head of the screw hole-containing screw member is engaged with the locking hole of the seat to lock it, as well as to project from the locking hole and is engaged by the engaging portion of the cutting tip in the first embodiment. Thus, the seat is fixed by the head of the screw hole-containing screw member before the cutting tip is seated.

DESCRIPTION OF THE PREFERRED EMBODIMENTS OF THE INVENTION

An embodiment of the present invention will be described based on drawings.

Figure 2:
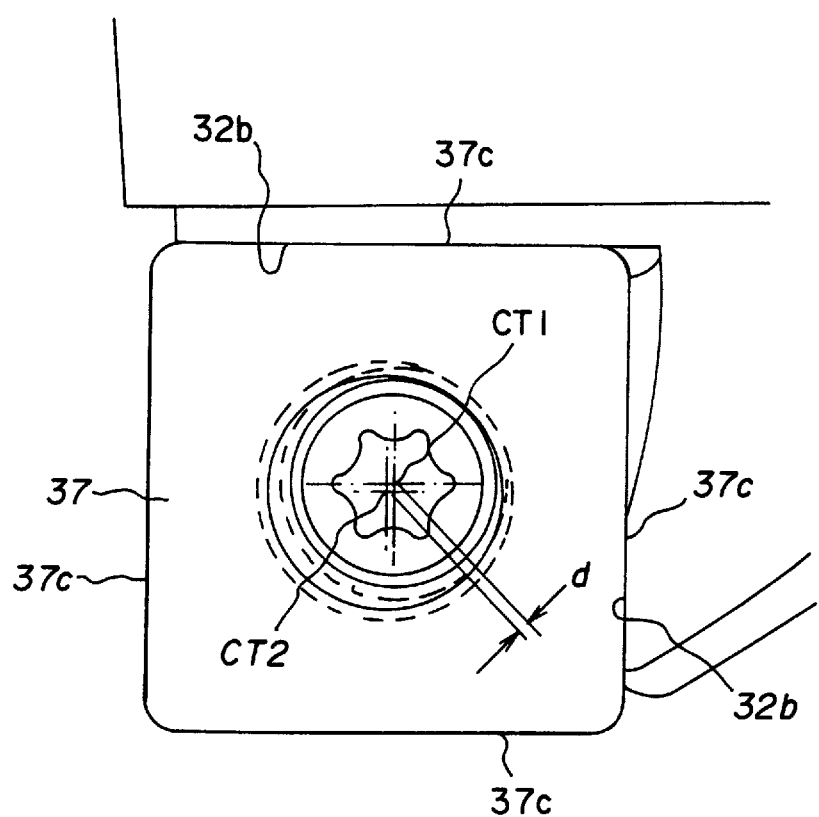
FIG. 2 is a side elevational view showing the tip clamp mechanism of FIG. 1.
Figure 3:
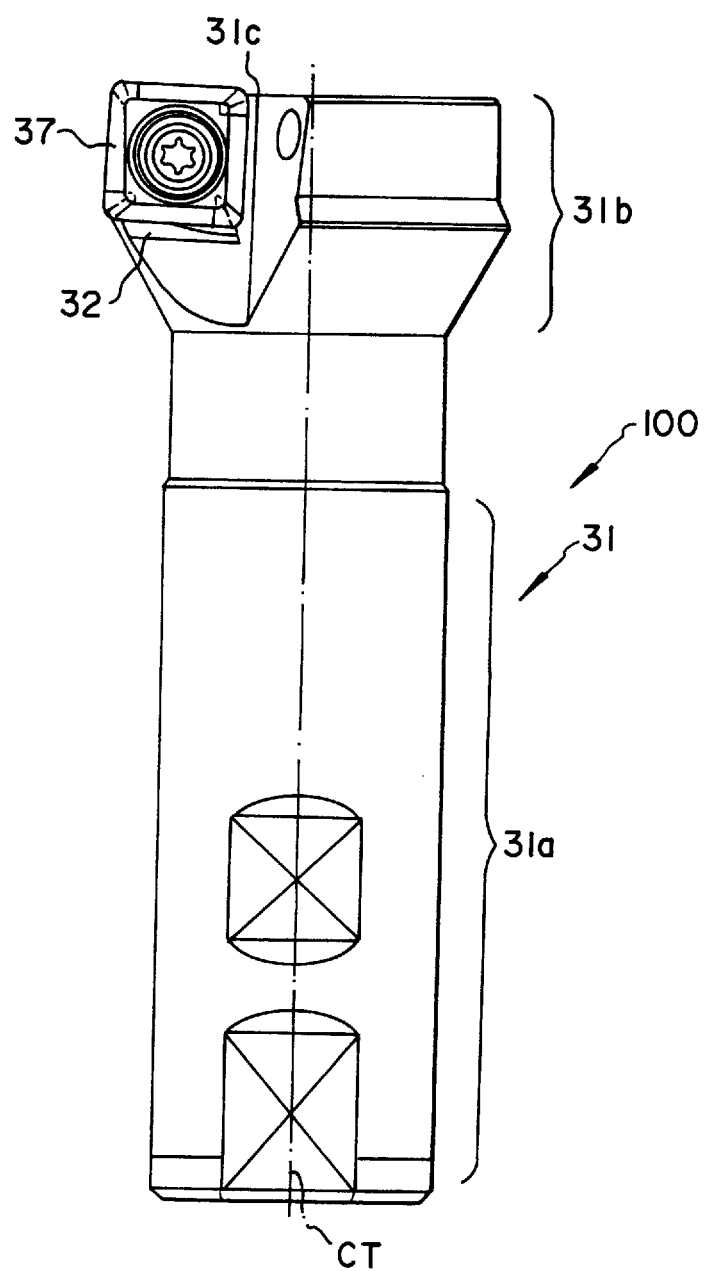
FIG. 3 is a side elevational view showing an end mill to which the tip clamp mechanism of FIG. 1 is applied.

FIG. 3 is a view showing a replaceable type end mill 100 to which the disposable tip clamp mechanism of the present invention is applied. The tool main body 31 of the end mill 100 is composed of steel, or the like, formed with a columnar shape. The base end portion of the tool main body 31 contains a shank 31a which is mounted to the spindle side of a machine tool (not shown) and a tip mounting seat 32 is formed on the outside edge of the opposite end 31b of the tool main body 31. The tip mounting seat 32 is composed of a seat bottom surface 32a, shown in FIG. 1, which forms a plane surface parallel with the axis of rotation CT of the end mill 100 and a pair of tip positioning wall surfaces 32b, 32b extending steeply from the seat bottom surface 32a and intersecting each other at right angles, as shown in FIG. 2.

Figure 1:
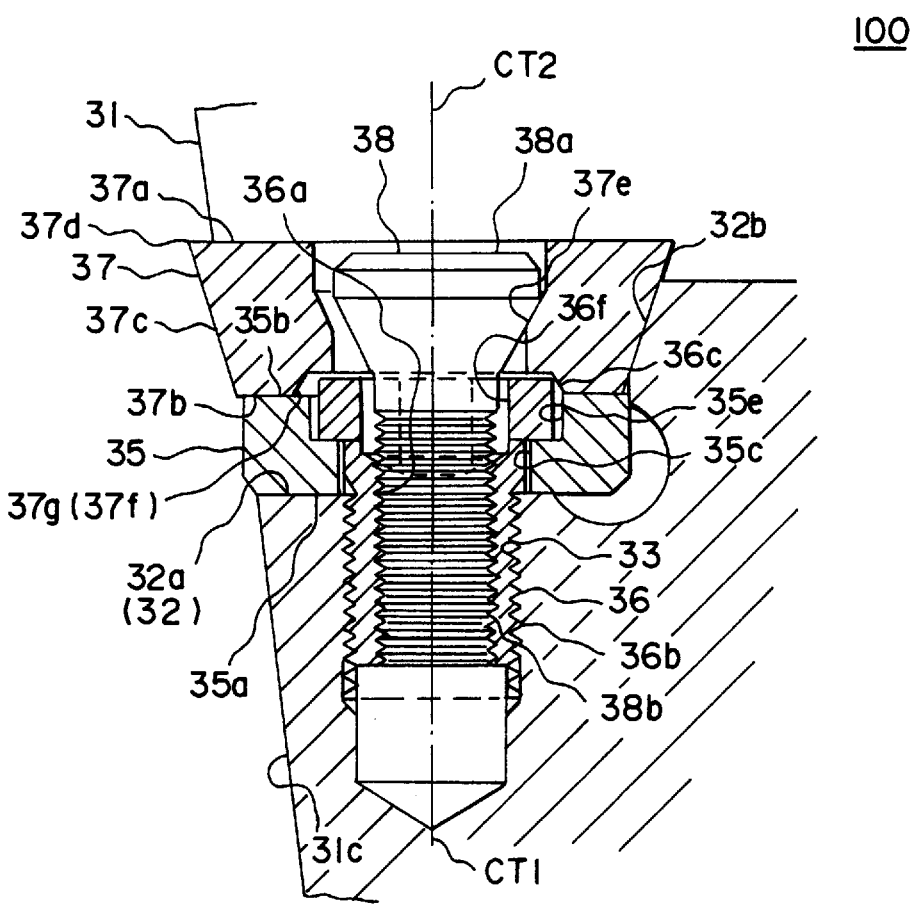
FIG. 1 is a front cross sectional view showing an embodiment of a clamp mechanism for a disposable tip according to the present invention.

Further, a mounting screw hole 33 which intersects the seat bottom surface 32a at right angles is formed at the center of the seat bottom surface 32a of FIG. 1.

A seat 35 is seated on the seat bottom surface 32a. The seat 35 is composed of a hard material, such as cemented carbide, high speed steel, or the like, formed to a square flat-sheet shape and has a back surface arranged as a seating surface 35a to be seated on the seat bottom surface 32a of the tip mounting seat 32 and a front surface arranged as a tip seating surface 35b on which a disposable tip 37 is seated. Further, the side surfaces of the seat 35 are abutted against the tip positioning wall surfaces 32b, 32b of the tip mounting seat 32 and a locking hole 35c communicating with the mounting screw hole 33 of the tip mounting seat 32 is formed at the center of seat 35 so as to pass therethrough. The diameter of the locking hole 35c of the seat 35 is enlarged on the tip side thereof and forms an annular recessed portion 35e.

A screw hole-containing screw member 36 having a screw hole 36a passing through the interior thereof is inserted into the portion covering the locking hole 35c of the seat 35 and the mounting screw hole 33 and the male screw 36b formed on the extreme end side of the screw hole-containing screw member 36 is threaded by connecting with the mounting screw hole 33. Further, the screw hole-containing screw member 36 has an annular projecting head portion 36c which is engaged with the annular recessed portion 35e of the locking hole 35c of the seat 35 to thereby lock the seat 35. The extreme end of the head portion 36c projects from the annular recessed portion 35e of the locking hole 35c, that is, projects from the tip seating surface 35b of the seat 35. In addition, hexagonal hole 36f is formed in the upper end of the screw hole 36a of the screw hole-containing screw member 36 for rotating the screw member 36. Note that a cross- or kerf-shaped groove may be used in place of the hexagonal hole 36f.

The disposable tip 37 is seated on the seat 35. The tip 37 of the present invention is composed of a hard material, such as cemented carbide, or the like, formed to an approximately square flat shape with one side larger than the seat 35 to produce a front surface arranged as a rake face 37a, a back surface on the opposite side arranged as a seating surface 37b, and further, four side surfaces arranged as flank faces 37c, respectively. Thus, the disposable tip 37 is arranged as a positive tip by forming a relief angle on each of these flank faces 37c. A cutting edge 37d used for cutting is formed on the ridgeline where the rake face 37a intersects the respective flank faces 37c. In addition, two of the four flank faces 37c of the disposable tip 37 abut against the chip-positioning wall surfaces 32b, 32b of the tip mounting seat 32, as shown in FIG. 2.

A tip hole 37e, communicating with the screw hole 36a of the screw member 36, is formed at the center of the tip 37 so as to pass therethrough and the inside periphery of the tip hole 37e is formed with a tapered shape for gradually reducing the diameter of the tip hole 37e toward the seat 35. An engaging portion 37f, whose diameter is enlarged to an annular shape, is formed at the opening end of the tip hole 37e on the seating surface 37b side thereof and a tapered surface 37g, whose diameter is gradually enlarged toward the opening end side, is formed to the inside periphery of the engaging portion 37f. The head portion 36c of the above screw hole-containing screw member 36 is inserted into the engaging portion 37f and the center axis CT1 of the screw member 36 is off-centered by a predetermined amount d toward the corner of the tip positioning wall surfaces 32b, 32b with respect to the center axis CT2 of the disposable tip 37 which is coincident with the center line of the chip hole 37e, as shown in FIG. 2. Therefore, the diameter of the engaging recessed portion 37f at the opening end thereof is set larger than the value obtained by adding twice the predetermined amount d of the off-centered portion to the outside diameter of the head portion 36c of the screw hole-containing screw member 36.

Further, a tip mounting screw 38 is inserted into the tip hole 37e of the tip 37 as shown in FIG. 1, the head portion 38a thereof being locked to the inner periphery of the tip hole 37e and the tip mounting screw 38 being threaded in the screw hole 36a of the screw member 36.

Since the end mill 100 to which the disposable tip clamp mechanism of the present invention is applied has the arrangement as described above, the tip 37 can be mounted to the tool main body 31 of the end mill 100 as described below.

That is, first, the seat 35 is seated on the seat bottom surface 32a of the tip mounting seat 32 of the tool main body 31 in the state that the locking hole 35c of the seat 35 coaxially communicates with the mounting screw hole 33 of the tip mounting seating 32. At the time, the side surfaces of the seat 35 are abutted against the tip positioning wall surfaces 32b, 32b of the tip mounting seat 32. Next, the screw hole-containing screw member 36 is inserted from the locking hole 35c of the seat 35 to the mounting screw hole 33 of the tip mounting seat 32 and the hexagonal hole 36f of the head portion 36c thereof is rotated by a tool, such as a hexagon wrench, or the like, engaged therewith, to thereby cause the screw member 36 to be threadedly connected with the mounting screw hole 33 of the tip mounting seat 32.

Then, the head portion 36c of the screw hole-containing screw member 36 is engaged with the annular recessed portion 35e formed in the locking hole 35c of the 35 whereby the seat 35 is pushed against the seat bottom surface 32a of the tip mounting seat 32.

As described above, since the seat 35 can be fixed preliminarily by the head portion 36c of the screw hole-containing screw member 36 before the disposable tip 37 is seated, a mounting task to be carried out thereafter can be simplified. Further, the seat 35 can be accurately and securely mounted to the tip mounting seat 32.

In addition, the head portion 36c of the screw hole-containing screw member 36 is projected from the annular recessed portion 35e of the seat 35 at the time. In other words, it projects from the chip seating surface 35b of the seat 35.

Next, the disposable tip 37 is seated on the seat 35. At the time, two of the four flank faces 37c of the tip 37 shown in FIG. 2 are abutted against the tip-positioning wall surfaces 32b, 32b. Then, the center axis CT2 of the tip 37 is placed off-center in the direction whereby it is separated from the corner of the tip-positioning wall surfaces 32b, 32b with respect to the center axis CT1 shown in FIG. 2 of the screw member 36 of FIG. 1. Further, since the diameter of the engaging portion 37f at the opening end thereof is set larger than the value obtained by adding twice the predetermined amount d of the off-centered portion to the outside diameter of the head portion 36c of the screw member 36 at the time, the head portion 36c of the screw member 36 is inserted into the engaging recessed portion 37f of the tip 37. As shown in FIG. 1, the tip hole 37e of the tip 37 is caused to communicate with the screw hole 36a of the screw hole-containing screw member 36 in the state that they are similarly off-centered and the head portion 36c of the screw member 36 is caused to contact or approach the portion of the tapered surface 37g of the engaging portion 37f of the tip 37 on the tip-positioning wall surfaces 32b, 32b side thereof.

Then, the tip mounting screw 38 is inserted into the screw hole 36a of the screw member 36 from the tip hole 37e of the tip 37 and threadedly connected with the screw hole 36a and the head portion 38a thereof is engaged with the inside periphery of the tip hole 37e. When the tip mounting screw 38 is tightened further, the tip 37 is pressed against, and fixed to, the seat bottom surface 32a of the tip mounting seat 32 through the seat 35. At that time, since the screw hole-containing screw member 36 is inserted further into the inside of the engaging portion 37f of the disposable tip 37 relatively, the head portion 36c of the screw member 36 is moved relative to the portion of smaller diameter end of the tapered surface 37g of the engaging portion 37f of the tip-positioning wall surfaces 32b, 32b sides thereof and pressed against, or caused to more closely approach, the tapered surface 37g on the tip-positioning wall surfaces 32b, 32b sides thereof.

Since the tip mounting screw 38 is threadedly connected with the screw hole 36a of the head portion 36c of the screw member 36 through the tip hole 37e of the disposable tip 37, it is off-centered toward the tip-positioning wall surface 32b, 32b sides with respect to the center axis CT2 of the tip 37. Thus, the tip mounting seat 32 sides of the head portion 38a of the tip mounting screw 38 press the inside periphery of the tip hole 37e of the tip 37 on the tip-positioning wall surfaces 32b, 32b sides thereof, by which the tip 37 is positioned by being pressed against the tip-positioning wall surfaces 32b, 32b of the tip mounting seat 32.

Figure 6:
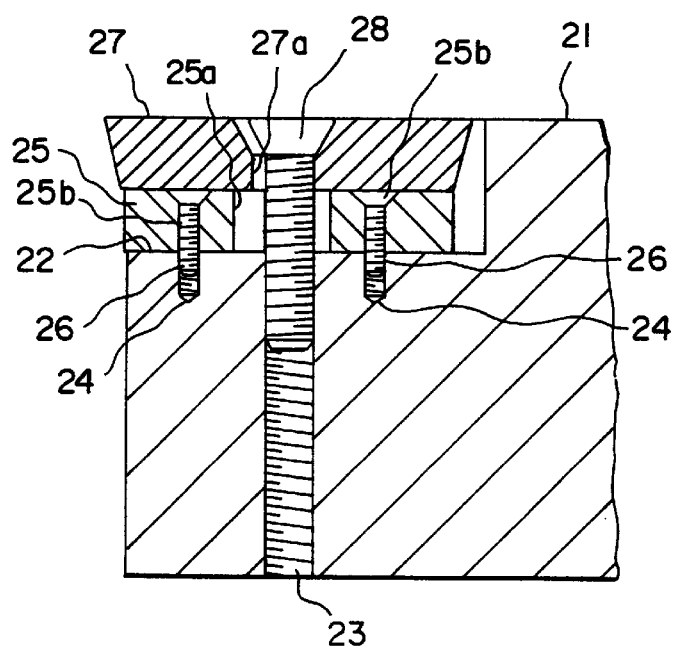
FIG. 6 is a front cross sectional view showing another example of a disposable tip conventional clamp mechanism.

Since the distance between the position at which the head portion 38a of the tip mounting screw 38 (that is, the position of the tip hole 37e of the disposable tip 37) and the position at which the tip mounting screw 38 is threaded, is shorter than that of the conventional example shown in FIG. 6, the tip mounting screw 38 is more difficult to be bent and deformed than the conventional example by a force, such as a centrifugal force, or the like, which tends to separate the disposable tip 37 of the FIG. 1 from the tip positioning wall surfaces 32b, 32b. Thus, the tip mounting screw 38 can exhibit a dislocation prevention effect of a disposable tip 37 which is higher than a conventional one.

When a force large enough to bend the tip-mounting screw 38 acts on the tip 37 and the tip 37 tends to separate from the tip positioning wall surfaces 32b, 32b, the head portion 36c of the screw hole-containing screw member 36 locks the tapered surface 37g of the engaging portion 37f of the tip 37 on the tip-positioning wall surfaces 32b, 32b sides thereof. By this action, the position dislocation prevention effect of the tip 37 is enhanced.

Since the number of parts is reduced by the mounting of the disposable tip 37 as described above, as compared with the case in which the seat 25 is fixed by the plurality of pins 26, 26, as in the case of the conventional example shown in FIG. 6, as well as that no small parts, such as the pins 26, 26, are used, the disposable tip 37 can be simply mounted through the seat 35, as shown in FIG. 1.

Figure 4:
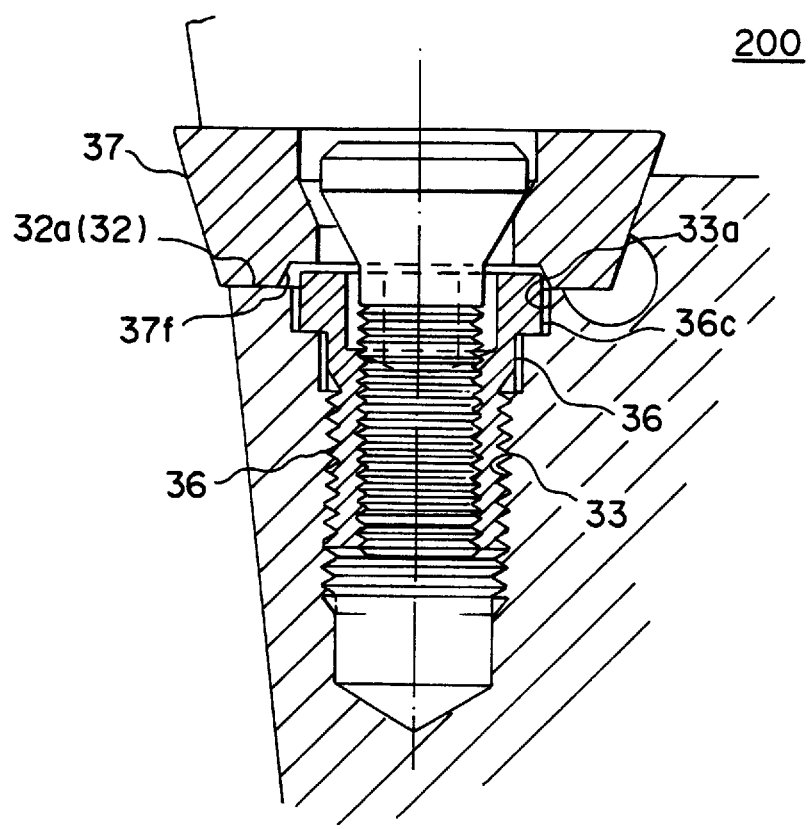
FIG. 4 is a front cross sectional view showing another embodiment of the disposable tip clamp mechanism of the present invention.
Figure 5:
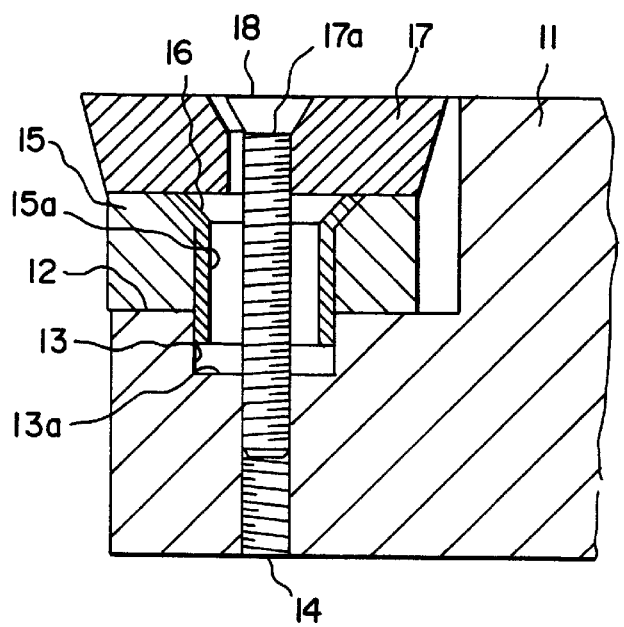
FIG. 5 is a front cross sectional view showing an example of a conventional disposable tip clamp mechanism.

FIG. 4 is a front cross sectional view showing another embodiment of the disposable tip clamp mechanism of the present invention and a replaceable type end mill 200 to which the disposable tip clamp mechanism is applied that is similar to the end mill 100 of FIG. 1, from which the seat 35 is omitted.

That is, as shown in FIG. 4, the end mill 200 is arranged such that an annular recessed portion 33a having an enlarged diameter is formed at the opening end of the mounting screw hole 33 of the seat bottom portion 32a of a tip mounting seat 32, and a screw hole-containing screw member 36 is threadedly connected with the mounting screw hole 33 with the head portion 36c thereof engaged with the annular recessed portion 33a and the extreme end of the head portion 36c projecting from the seat bottom surface 32a of the tip mounting seat 32. A disposable tip 37 is seated on the tip mounting seat 32 in the state that the engaging portion 37f thereof is engaged with the head portion 36c of the screw member 36. An effect similar to that of the embodiment of FIG. 1 can also be achieved in this embodiment, except the locking of the seat 35.

Although the above two embodiments show cases in which the disposable tip clamp mechanism of the present invention is applied to end mills, it is needless to say that the disposable tip clamp mechanism of the present invention is also applicable to a replaceable type byte, boring bar, cutter, or the like. Further, the present invention includes the arrangement that the diameters of the head portion 36c of the screw hole-containing screw member 36 and the engaging portion 37f are not enlarged.

According to the disposable tip clamp mechanism of the present invention, since the tip mounting screw is difficult to bend, when a force for separating the tip from the tip-positioning wall surfaces is applied by a centrifugal force, or the like, a high displacement prevention effect can be exhibited by locking the tip mounting screw and, even if the tip is urged to separate from the tip-positioning wall surfaces against the tip mounting screw, it is locked by the screw hole-containing screw member, by which the dislocation prevention effect can be enhanced. With this arrangement, the dislocation prevention effect of the disposable tip is enhanced.

Further, since the disposable tip is mounted by a small number of parts without using small parts, the mounting task can be simplified.

Also, according to the disposable tip clamp mechanism of the invention, since the seat can be fixed by the head portion of the screw hole-containing screw member, in addition to the above advantage the mounting task can be simplified.

What is claimed is:

1. A disposable cutting tip clamp mechanism arranged such that a disposable cutting tip having a hole formed at the center thereof to enable a screw to pass therethrough is seated on a tip-mounting seat disposed on a tool main body, a tip-mounting screw is inserted into the hole of the disposable tip for fixing the tip by locking a head portion of the tip mounting screw to the hole, characterized in that:

the tip-mounting seat has a seat bottom surface on which the tip-mounting screw hole is formed, and tip-positioning wall surfaces extend steeply from said seat bottom surface for positioning the disposable tip;

a mounting hole is formed in the seat bottom surface of the tip-mounting seat;

a screw member having a screw hole at a head portion thereof is threadedly connected with said mounting screw hole, with the head portion projecting from the seat bottom surface of the tip-mounting seat;

the hole through the disposable tip has an engaging portion into which the head portion of said screw member is inserted and engaged;

said screw member being disposed off-center toward the tip-positioning wall surfaces with respect to the hole of the disposable tip; and the tip-mounting screw fixing the disposable tip by being threaded with the screw hole in the screw member.

2. A disposable cutting tip clamp mechanism according to claim 1, characterized in that:

a seat having a locking hole being interposed between the tip-mounting seat and the disposable tip;

said screw member being inserted into the locking hole of said seat; and the head portion of said screw member being engaged with the locking hole of said seat to lock said screw member and said screw member projecting from the locking hole and engaging with said engaging portion of the disposable tip.

* * * * *